United States Patent Office 2,979,454
Patented Apr. 11, 1961

2,979,454

DRILLING MUD

Joseph E. Fields and John H. Johnson, Dayton, Ohio, assignors to Monsanto Chemical Company, St. Louis, Mo., a corporation of Delaware No Drawing. Filed Mar. 20, 1957, Ser. No. 647,218

5 Claims. (Cl. 252—8.5)

This invention relates to drilling fluids or muds such as are employed in the rotary drilling of oil and gas wells. More particularly, it relates to the treatment of such drilling muds to control their viscosity.

Drilling of an oil or gas well by the rotary method is performed by rotating a bit attached to the end of a hollow drill pipe, known as a drill stem, which extends downwardly through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then up through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drill hole.

The ability of any given mud to carry out these important functions depends upon certain readily measurable physical properties. Viscosity is an important characteristic. The drilling mud must have a viscosity sufficiently high to permit it to effectively suspend and remove the cuttings from the bottom of the well. On the other hand, the viscosity must at the same time be low enough so that the mud may be readily circulated at the desired rates without requiring excessive pump pressures and/or power consumption.

The properties of the drilling mud are changed during drilling because the strata traversed are composed of shales, clays, etc., which become dispersed in the fluid and produce a gradual increase in the viscosity of the drilling mud with continued use. Contamination by salt brines or as a result of cementing operations likewise causes undesirable increases in viscosity. The custom of using weighting materials, such as barytes or hematite, to increase the density of the mud also results in increased viscosity. If the viscosity is allowed to become too great, difficulties are encountered both in pumping the mud and in removing cuttings from the mud at the surface. Another serious problem with highly viscous fluids is that of "gas cutting." The gas from the formation or formations through which the well passes becomes entrained in the drilling fluid since it cannot readily escape in the surface pits and the fluid which is recirculated consequently has a lighter weight than is desired. This greatly lessens its effectiveness in holding back formation pressures and significantly increases the possibilities of a blowout. For these reasons, it is obvious that the consistency of the drilling mud must be carefully controlled.

Considerable work has been done in an attempt to develop additives to impart desirable viscosity characteristics to drilling muds. In practice, reduction in viscosity may be achieved by dilution with water or by the addition of various materials commonly called "thinners" or "deflocculants." The former method, while it may be satisfactory in specific instances, has many drawbacks and disadvantages and so the practice of adding various chemicals to drilling fluids to reduce viscosity has become more or less standard. A large number of chemicals such as pyrophosphates, polyphosphates, tannates, humates, phytates, and the like have been employed in the prior art. In many cases, however, the extent to which a drilling fluid can be controlled by such chemicals is limited.

Accordingly, it is an object of the present invention to provide novel, effective, and improved additives which may be employed for the reduction of viscosity in drilling fluids.

A second object of the invention is to provide a method of controlling the viscosity of aqueous drilling muds without adversely affecting other properties such as gel strength and filtration rate.

Another object of the invention is to provide an aqueous drilling fluid having controlled viscosity.

A still further object of the invention is to provide an improved method of drilling oil or gas wells in which the water-base drilling mud herein described is employed.

Other objects and advantages will become apparent to those skilled in the art from the following description and appended claims.

These objects may be accomplished according to the present invention by incorporating in the water-base drilling fluid a sufficient amount of a low-molecular-weight copolymer of an olefin and maleic anhydride to maintain the viscosity of the fluid at the desired level. The composition of the present invention may be described briefly as a mixture comprising finely divided solid material, an aqueous vehicle in which the solid material is dispersed or suspended and a sufficient amount of a low-molecular-weight copolymer of an olefin and maleic anhydride to maintain the viscosity of the fluid at the desired level. By a "low-molecular-weight copolymer" is meant a copolymer of an olefin and maleic anhydride whose 1% solution in dimethylformamide has a specific viscosity below a value of 0.7 and preferably has a value in the range from about 0.05 to about 0.3 at 25° C. Wherever in this specification and claims specific viscosity is mentioned, it is to be understood that this is determined at 25° C. on a 1% solution (by weight) of the anhydride form of the copolymer in dimethylformamide.

The finely divided solid material of the invention may, of course, be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clayey subsurface formations are drilled. Weighting materials added to increase specific gravity such as barytes, iron oxide, and the like may also be included.

The aqueous medium may be fresh water such as is obtained from wells or streams; it may be salt water from the sea or from wells; or it may even include oil-in-water emulsions, i.e., water which has become contaminated in some way with small quantities of oil, or to which such oil has been added to gain some desired advantage.

It is contemplated that the drilling muds of the invention may also contain other additives besides the copolymers of olefins and maleic anhydride of the invention. Materials such as caustic, quebracho, lime, and the like may be added to the drilling mud at the surface while other materials such as gypsum, shale or the like may be encountered in subsurface formations during drilling operations.

The quantities of the olefin-maleic anhydride copolymers to be employed in the drilling mud of the invention will vary with circumstances over a reasonably wide range and the amount employed in a specific suspension or dispersion will depend on these circumstances and the characteristics of the drilling fluid treated. Ordinarily, satisfactory results with regard to viscosity control will be obtained with quantities ranging from one to four pounds per 42-gallon barrel of drilling mud. In some cases where, for example, only small improvements in viscosity is desired, as little as 0.1 lb. of the additive per barrel of mud will produce the desired effect. Above about 4 lb. per barrel, the small increase in most cases would not warrant the increased expense of the additional material. The use of larger amounts of the copolymers, for example, in quantities up to 6 lb. per barrel, would not usually have any harmful effects on the mud, but excessive quantities might lead to over-treatment, i.e., produce an increase in viscosity. The exact amount to be added, as previously pointed out, depends upon the original character of the mud and on the properties desired. This can be determined, as is customary in the field, by simple routine tests at the time the addition is made.

The olefin-maleic anhydride copolymers useful in the invention are readily prepared by techniques well known in the art such as, for example, the methods described in U.S. Patent 2,378,629. Generally, the copolymers are prepared by reacting a mono-olefin having a terminal methylene group with maleic anhydride in the presence of a peroxide catalyst in an aliphatic or aromatic hydrocarbon which is a solvent for the monomers but is a non-solvent for the copolymer formed. Olefins containing from one to eight carbon atoms are preferred. Those which may be employed include, for example, ethylene, propylene, isobutylene, diisobutylene, 1-butene, 1-pentene, 1-hexene, 3-methyl-butene-1 and the like. Suitable solvents include benzene, toluene, xylene, chlorinated benzene, hexane, acetone, ethylene dichloride and the like. While benzoyl peroxide is the preferred catalyst, other peroxides such as acetyl peroxide, butyryl peroxide, di-tertiary-butyl peroxide, lauroyl peroxide and the like are all satisfactory since they are soluble in organic solvents. The copolymer contains substantially equimolar quantities of the olefin residue and the maleic anhydride residue. The properties of the polymer such as molecular weight, for example, may be regulated by proper choice of the catalyst and control of one or more of the variables such as ratio of reactants, temperature, and catalyst concentration. Molecular weight control is also effectively achieved by including in the polymerization mixture regulators such as phosphites, hydrocarbon carboxylic acids free from aliphatic unsaturation and having at least one hydrogen atom attached to an α-carbon atom, a mixture of (a) benzene, a halobenzene, or a haloparaffin with (b) an alkylated aromatic hydrocarbon having at least a one α-carbon atom, aldehydes free from non-hydrocarbon substituents, mercaptans, and the like. The product is obtained in solid form and is easily recovered by filtration, centrifugation or the like. Removal of any residual or adherent solvent may be effected by evaporation using moderate heating.

Particularly useful as the drilling mud additives of the invention are various derivatives of the olefin-maleic anhydride copolymers such as the acid, the partial acid, the salts, the partial salts, the partial esters, the imides, the partial imides, the amides, the partial amides, and the like. These are prepared by the common techniques well known to those skilled in the art. For example, the copolymers are readily hydrolyzed by heating with water to yield the acid form of the copolymer having the structure

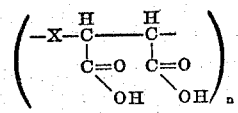

wherein X is the olefinic residue such as

in the case of ethylene, for example, and

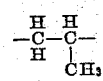

in the case of propylene, etc., and n is the number of repeating units in the polymer.

The alkali metal, alkaline earth metal, ammonium or quaternary ammonium salts may be readily obtained by reacting the copolymer in its anhydride or acid form with the stoichiometric amount of the corresponding hydroxide. Alkali metal salts of the copolymers such as sodium, potassium, and lithium salts, alkaline earth metal salts such as barium and calcium salts, the ammonium salt, and the benzyl trimethyl ammonium salt which may be prepared in this manner are all useful in the invention. Partial salts may, of course, be produced by using less than the quantity of alkali required to effect complete conversion of the carboxyl groups. Similarly, other salts of the copolymers, i.e., the di- or partial salts of amines, such as methylamine, triethylamine, diethanolamine, pyridine, piperidine, and morpholine salts, and of heavy metals such as iron, aluminum, copper, and lead salts, are effective drilling mud additives in accordance with the invention.

Especially preferred as viscosity-reducing agents is the half-amide, half-ammonium salt form of the copolymers having the structure

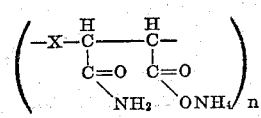

wherein X is the olefinic residue and n is the number of repeating units in the polymer. These preferred products may be readily prepared by contacting the particles of the finely divided copolymer with ammonia gas at ordinary or elevated temperatures. Moisture may be present if desired. Heat is liberated in the reaction and it is desirable, therefore, to provide some means for dissipating it so that the product will not be affected by excessively high temperatures. One effective means for controlling the heat of reaction consists of suspending the solid polymer in an inert organic liquid such as benzene and bubbling ammonia through the slurry.

The half-amide, half-ammonium salt may be converted to the imide derivative by heating at a temperature from about 60° to about 150° C.

Esterification of the copolymer is easily effected by reacting it with an alcohol, e.g., methyl, ethyl, propyl, etc.

By choice of esterification conditions, partial esters can be obtained running the gamut of extent of esterification; partial esters in which from 0.2 to 0.8 of the total carboxyl groups are esterified are preferred, and the half-esters, i.e., those in which 0.5 of the total carboxyl groups are esterified, are quite suitable. Water-soluble diesters can also be used, and can be made by esterifying the copolymer with a water-solubilizing alcohol, e.g., an ether-alcohol made by reacting several moles of ethylene oxide with a lower aliphatic alcohol.

The following examples are presented to particularly illustrate the invention but they are not intended to limit it in any manner except as it is limited in the appended claims.

EXAMPLE I

A synthetic drilling mud was prepared containing 35% solids suspended in water. On a dry basis, the solids consisted of 10 parts by weight of Tennessee ball clay, 1 part by weight of bentonite and 4 parts by weight of Dixie bond clay. The "break-over" from sodium-base to lime-base fluid was achieved by adding 5 g. of hydrated lime for each 350 ml. of the suspension and varying amounts of a hydrolyzed copolymer of ethylene and maleic anhydride having a specific viscosity of 0.064. Before use the copolymer had been reacted with the stoichiometric quantity of sodium hydroxide and enough water to effect solution to convert it to the sodium salt form. This reaction is an exothermic one and is easily carried to completion. The addition of caustic usually required in "break-over" was obviated in this case by the basic nature of the copolymer additive. The samples were then tested by means of the standard procedures given in "Recommended Practice for Standard Field Procedure for Testing Drilling Fluids" of the American Petroleum Institute, third edition, May 1950, except as otherwise indicated. In most cases the flow behavior of the mud was determined with a multispeed Fann V-G viscosimeter. A description of this instrument, the plastic flow properties it measures, and their significance in drilling mud control may be found in Melrose and Lilienthal, J. Pet. Tech., T.P. 3061, p. 159 (1951). In general, field control of mud viscosity properties is directed toward the maintenance of a constant and preferably a low resistance to flow. The measurement of this resistance to flow with the Fann viscosimeter is the yield value which is actually a measurement of the interparticle forces in the mud. Chemical treatment of the mud directly affects the yield value, hence, the effectiveness of a particular chemical additive as a thinner or in reducing resistance to flow is directly measurable by means of the yield value. Results of the tests are presented in Table I.

*Table I.—Ethylene-maleic anhydride copolymer additive*

| Amt. of Additive (lb./bbl.) | pH | Viscosity | | | Gel Strength | | Filtration Rate (cc. in 30-min API) |
|---|---|---|---|---|---|---|---|
| | | 600 r.p.m. Fann (cp.) | Plastic (cp.) | Yield Point (lb./100 ft.²) | 0-Min. (g.) | 10-Min. (g.) | |
| 0.0 | ---- | [1] Plastic | [1] Plastic | [1] Plastic | [1] Plastic | [1] Plastic | 50 (1.5 min.) |
| 0.5 | 12.5 | 35 | 12 | 46 | 50 | 70 | 60.5 |
| 1.0 | 12.5 | 8.5 | 8 | 1 | 0 | 5 | 48 |
| 1.5 | 12.5 | 6.5 | 6 | 1 | 0 | 5 | 43 |
| 2.0 | 12.5 | 5.5 | 5 | 0 | 0 | 0 | 38.5 |
| 3.0 | 12.5 | 6.0 | 6 | 0 | 0 | 0 | 25.5 |
| 4.0 | 12.5 | 6.5 | 7 | 0 | 0 | 0 | 18.0 |

[1] Above 150 centipoises or not measurable.

These data demonstrate that the addition of the low molecular weight copolymers of ethylene and maleic anhydride of the invention in quantities of one lb. per barrel and upwards effects a drastic reduction in viscosity of the mud without adversely affecting its thixotropic properties or its filtration rate characteristics. In fact, these ethylene-maleic anhydride copolymers tend to enhance these other properties as well although they have not as dramatic and conclusive an effect upon them as they do upon viscosity. Samples of other ethylene-maleic anhydride copolymers having specific viscosities of 0.054, 0.110, and 0.239, respectively, were also tested after they had been converted into the sodium salt form. It was found that comparable quantities of each of these polymeric materials produced effects on viscosity in the same order of magnitude as did the copolymer additive of Example I on the same stock mud samples. In these cases, too, not only was no adverse effect on gel strength or filtration rate observed, but some actual improvement in these properties was noticed.

EXAMPLE II

The tests described in Example I were repeated using a copolymer of ethylene and maleic anhydride having a specific viscosity of 0.09. The copolymer in this case was added to the mud in the form of its half-amide, half-ammonium salt. Results tabulated in Table II demonstrate the effectiveness of this additive.

*Table II.—Ethylene-maleic copolymer additive*

| Amt. of Additive (lb./bbl.) | pH | Viscosity | | | Gel Strength | | Filtration Rate (cc. in 30-min API) |
|---|---|---|---|---|---|---|---|
| | | 600 r.p.m. Fann (cp.) | Plastic (cp.) | Yield Point (lb./100 ft.²) | 0-Min. (g.) | 10-Min. (g.) | |
| 0 | 12.0 | [1] Plastic | [1] Plastic | [1] Plastic | ---- | ---- | 40.5 |
| 0.5 | 12.1 | [1] Plastic | [1] Plastic | [1] Plastic | ---- | ---- | 10 (1 min.) |
| 1.0 | 12.4 | 90 | 15 | 176 | 450 | 500 | 44 |
| 2.0 | 12.4 | 15 | 14 | 2 | 5 | 20 | 20 |
| 3.0 | 12.4 | 10.5 | 10 | 1 | 0 | 15 | 27.5 |
| 4.0 | 12.2 | 8.5 | 9 | 1 | 0 | 5 | 24.5 |

[1] Above 150 centipoises or not measurable.

EXAMPLE III

The same tests described in Example I were conducted using a copolymer of isobutylene and maleic anhydride hydrolyzed in the same manner as the copolymer of Example I with sodium hydroxide as the viscosity control agent. The copolymer employed had a specific viscosity of 0.13. Results of the tests are presented in Table III.

*Table III.—Isobutylene-maleic anhydride copolymer additive*

| Amt. of Additive (lb./bbl.) | pH | Viscosity | | | Gel Strength | | Filtration Rate (cc. in 30-min API) |
|---|---|---|---|---|---|---|---|
| | | Fann (cp.) | Plastic (cp.) | Yield Point (lb./100 ft.²) | 0-Min. (g.) | 10-Min. (g.) | |
| 0.0 | 12.6 | [1] Plastic | [1] Plastic | [1] Plastic | | | 79.5 (16.5 min.) |
| 0.5 | 12.6 | [1] Plastic | [1] Plastic | [1] Plastic | | | 62 (11 min.) |
| 1.0 | 12.7 | 130 | 30 | 200 | 300 | 300 | 64 (21 min.) |
| 1.5 | 12.5 | 57.5 | 6 | 103 | 150 | 170 | 53.5 |
| 2.0 | 12.5 | 18.5 | 12 | 13 | 20 | 90 | 44.5 |
| 3.0 | 12.5 | 8.5 | 9 | −1 | 0 | 0 | 16.5 |
| 4.0 | 12.4 | 7.5 | 8 | −1 | 0 | 0 | 11.5 |

[1] Above 150 centipoises or not measurable.

The data demonstrate that the isobutylene-maleic anhydride copolymers of low molecular weight are highly effective viscosity control agents in drilling muds. In addition, like the ethylene-maleic anhydride copolymers of Examples I and II, these additives not only have no adverse effect on the thixotropic properties of the mud or its filtration rate, but actually result in some improvement of these properties although the improvement is not nearly so pronounced or obvious as that observed in viscosity values. Samples of other copolymers of isobutylene and maleic anhydride having specific viscosities of 0.34 and 0.57 were also tested in the same manner as that described just above on the same mud stock samples. Comparable quantities of each of these two copolymers produced viscosity effects in the same order of magnitude as those shown in Table III with no adverse effects on other mud properties. In fact, the same pattern of improvement in other properties as well was repeated here too. The half-amide, half-ammonium salt forms of the isobutylene-maleic anhydride copolymers is an excellent viscosity reducer or deflocculant when employed in drilling muds. Also highly useful are the diammonium salt form, the dipotassium salt form and the like.

EXAMPLE IV

The tests of Example I were again repeated this time using a low-molecular-weight copolymer of propylene and maleic anhydride in the sodium salt form having a specific viscosity of 0.09. Results are tabulated in Table IV.

*Table IV.—Propylene-maleic anhydride copolymer additive*

| Amt. of Additive (lb./bbl.) | pH | Viscosity | | | Gel Strength | | Filtration Rate (cc. in 30-min API) |
|---|---|---|---|---|---|---|---|
| | | Fann (cp.) | Plastic (cp.) | Yield Point (lb./100 ft.²) | 0-Min. (g.) | 10-Min. (g.) | |
| 0 | 11.3 | [1] Plastic | [1] Plastic | [1] Plastic | | | 52.5 (10.5 min.) |
| 0.5 | 11.8 | [1] Plastic | [1] Plastic | [1] Plastic | | | 50.5 (16 min.) |
| 1.0 | 12.0 | 125 | 10 | 230 | 200 | 230 | 34 |
| 1.5 | 12.2 | 10 | 10 | 0 | 0 | 0 | 23 |
| 2.0 | 12.3 | 7.5 | 8 | −1 | 0 | 0 | 20 |
| 3.0 | 12.3 | 8 | 8 | 0 | 0 | 0 | 14 |
| 4.0 | 12.4 | 7 | 7 | 0 | 0 | 0 | 11.5 |

[1] Above 150 centipoises or not measurable.

Samples of other propylene-maleic anhydride copolymers having specific viscosities of 0.06, 0.16, 0.21, 0.26, and 0.30, respectively, were also tested and results obtained were comparable with those presented in Table IV. In this field of viscosity control, excellent results can also be obtained with the dipotassium salt, the half-amide, half-ammonium salt, and the diammonium salt forms of the propylene-maleic anhydride copolymers. Generally, as the molecular weight of the copolymer increases, a small and gradual increase in the amount of additive required to reduce viscosity to a given level is observed. For example, three lb. of a propylene-maleic anhydride copolymer having a specific viscosity of 0.3 are required per barrel of drilling mud to reduce the mud to a Fann viscosity of 10 from a plastic stage, whereas with a copolymer having a viscosity of 0.06, only a small fraction over one lb. will effect this reduction. However, it is also generally true that a lesser amount of the copolymers of the invention is required to secure a given level of viscosity than is usual with the known viscosity reducing agents of the prior art.

EXAMPLE V

Since it is important that the drilling mud be stable at the bottom hole temperatures encountered in drilling which sometimes reach as high as 250° F., the mud compositions of Examples I, II, III, and IV were subjected to a temperature of 300° F. for 72 hrs. and then retested by the same procedures used originally. The data obtained are presented in Table V.

*Table V.—Olefin-maleic anhydride copolymer additives*

| Copolymer Additive | Amount of Additive (lb./bbl.) | pH | Viscosity | | | Gel Strength | | Filtration Rate (cc. in 30-Min. API) |
|---|---|---|---|---|---|---|---|---|
| | | | Fann (cp.) | Plastic (cp.) | Yield Point (lb./100 ft.²) | 0-Min. (g.) | 10-Min. (g.) | |
| Blank | 0 | ---- | ⁵ Plastic | ⁵ Plastic | ⁵ Plastic | ⁵ Plastic | ⁵ Plastic | 50 (1.5 min.) |
| EMA ¹ | 0.5 | 10.9 | 16 | 11 | 10 | 20 | 40 | 32.5 |
| EMA ¹ | 1.0 | 11.0 | 17 | 11 | 12 | 10 | 50 | 20 |
| EMA ¹ | 1.5 | 11.0 | 16.5 | 10 | 13 | 10 | 70 | 19 |
| EMA ¹ | 2.0 | 11.1 | 18.5 | 13 | 11 | 20 | 70 | 26 |
| EMA ¹ | 3.0 | 11.2 | 16.5 | 12 | 9 | 10 | 70 | 24 |
| EMA ¹ | 4.0 | 11.1 | 20.0 | 22 | 0 | 0 | 90 | 18 |
| | 0 | 10.9 | 80 | 90 | 20 | 30 | 120 | 49.5 |
| Blank | 0.0 | 9.7 | ⁵ Plastic | ⁵ Plastic | ⁵ Plastic | ⁵ Plastic | ⁵ Plastic | 22 (10 min.) |
| EMA ² | 0.5 | 9.7 | ⁵ Plastic | ⁵ Plastic | ⁵ Plastic | ⁵ Plastic | ⁵ Plastic | 49 (25 min.) |
| EMA ² | 1.0 | 10.7 | 105 | 50 | 110 | 400 | 500 | 25 |
| EMA ² | 2.0 | 10.7 | 23 | 17 | 12 | 20 | 90 | 23 |
| EMA ² | 3.0 | 10.7 | 19 | 14 | 10 | 10 | 90 | 22 |
| EMA ² | 4.0 | 10.4 | 21 | 15 | 12 | 10 | 110 | 20 |
| IBMA ³ | 0.5 | 10.9 | 15 | 12 | 6 | 0 | 25 | 34 |
| IBMA ³ | 1.0 | 10.9 | 16.5 | 14 | 5 | 0 | 20 | 24 |
| IBMA ³ | 1.5 | 10.7 | 13 | 13 | 0 | 0 | 7 | 20 |
| IBMA ³ | 2.0 | 10.5 | 13.5 | 13 | 1 | 0 | 7 | 15 |
| IBMA ³ | 3.0 | 10.3 | 12.5 | 12 | 1 | 0 | 7 | 6.5 |
| IBMA ³ | 4.0 | 9.9 | 21.5 | 13 | 17 | 0 | 17 | 11.5 |
| | 0 | 10.3 | ⁵ Plastic | ⁵ Plastic | ⁵ Plastic | ---- | ---- | 18 (5 min.) |
| PMA ⁴ | 0.5 | 10.5 | 48.5 | 47 | 3 | 10 | 80 | 31 |
| PMA ⁴ | 1.0 | 10.6 | 45 | 32 | 26 | 50 | 220 | 16 |
| PMA ⁴ | 1.5 | 10.8 | 14.5 | 13 | 3 | 0 | 45 | 15.5 |
| PMA ⁴ | 2.0 | 10.8 | 11 | 11 | 0 | 0 | 15 | 15 |
| PMA ⁴ | 3.0 | 10.9 | 13 | 13 | 0 | 0 | 15 | 11 |
| PMA ⁴ | 4.0 | 10.9 | 15 | 16 | -2 | 0 | 50 | 8 |

¹ Ethylene-maleic anhydride copolymer (sodium salt form) $\eta_{sp}=0.064$.
² Ethylene-maleic anhydride copolymer (half-amide, half-ammonium salt form), $\eta_{sp}=0.09$.
³ Isobutylene-maleic anhydride copolymer (sodium salt form), $\eta_{sp}=0.13$.
⁴ Propylene-maleic anhydride copolymer (sodium salt form), $\eta_{sp}=0.09$.
⁵ Above 150 centipoises or not measurable.

When compared with the data given in Tables I–IV, the data in Table V convincingly demonstrate that the copolymer additives of the invention not only suffer no loss in their effectiveness as thinners when the mud in which they are incorporated is subjected to elevated temperatures but apparently in some instances appear to be slightly more effective at the high temperatures. The ability to maintain reduced viscosity under such severe temperature conditions is not a usual property found in most of the thinners of the prior art and makes these olefin-maleic anhydride copolymers highly advantageous. Comparable results were obtained in similar heating tests with muds to which the following copolymers were added: (1) ethylene-maleic anhydride copolymers having specific viscosities of 0.054, 0.110, and 0.239 respectively; (2) isobutylene-maleic anhydride copolymers having specific viscosities of 0.34 and 0.57; and (3) propylene-maleic anhydride copolymers having specific viscosities of 0.06, 0.16, 0.21, 0.26, and 0.30, respectively.

EXAMPLE VI

The viscosity-reducing characteristics of the low-molecular-weight copolymers of olefins and maleic anhydride in the form of their sodium salts employed in Examples I–IV were also determined with other types of mud in addition to the lime-treated mud of the examples already presented. Table VI shows the thinning effect of 10% aqueous solutions of ethylene-maleic anhydride (EMA), isobutylene-maleic anhydride (IBMA), and propylene-maleic anhydride (PMA) copolymers on 350-ml. samples of sodium-base mud. Various samples of each of these copolymer additives having different specific viscosities were added to the mud in varying quantities. The stock sodium-base mud was essentially that of Examples I–IV except that no lime was added.

A similar set of tests using the same additives were conducted on sea-water mud. The sea-water mud was made up in exactly the same manner as the sodium-base mud except that sea-water from the Gulf of Mexico was employed instead of fresh water. Results are tabulated in Table VII.

*Table VI.—Sodium-base mud*

| Copolymer Additive | $\eta_{sp}$¹ | Amt of Additive (lb./bbl.) | Viscosity | | | pH |
|---|---|---|---|---|---|---|
| | | | Fann (cp.) | Plastic (cp.) | Yield Pt. (lb./100 ft.²) | |
| Blank | Blank | 0 | ² 98 | ---- | ---- | 6.3 |
| EMA | 0.054 | 0.2 | ² 36 | ---- | ---- | 6.4 |
| EMA | 0.054 | 0.4 | ² 10 | ---- | ---- | 6.6 |
| EMA | 0.054 | 1.0 | ² 11 | ---- | ---- | 7.1 |
| Blank | Blank | 0 | ² 71 | ---- | ---- | 6.2 |
| EMA | 0.064 | 0.2 | ² 13 | ---- | ---- | 6.7 |
| EMA | 0.064 | 0.4 | ² 8 | ---- | ---- | 6.9 |
| EMA | 0.064 | 1.0 | ² 10 | ---- | ---- | 7.1 |
| Blank | Blank | 0 | ² 83 | ---- | ---- | 5.9 |
| EMA | 0.110 | 0.2 | ² 170 | ---- | ---- | 6.7 |
| EMA | 0.110 | 0.4 | ² 13 | ---- | ---- | 7.1 |
| EMA | 0.110 | 1.0 | ² 17 | ---- | ---- | 7.5 |
| Blank | Blank | 0 | ² 95 | ---- | ---- | 6.1 |
| EMA | 0.239 | 0.2 | ³ Plastic | ---- | ---- | 6.2 |
| EMA | 0.239 | 0.5 | ³ Plastic | ---- | ---- | 6.3 |
| EMA | 0.239 | 1.5 | ² 58 | ---- | ---- | 6.9 |
| EMA | 0.239 | 2.0 | ² 26 | ---- | ---- | 7.0 |
| Blank | Blank | 0 | ² 89 | 15 | 148 | 4.7 |

*Table VI.—Sodium-base mud*—Continued

| Copolymer Additive | $\eta_{sp}$[1] | Amt of Additive (lb./bbl.) | Viscosity | | | pH |
|---|---|---|---|---|---|---|
| | | | Fann (cp.) | Plastic (cp.) | Yield Pt. (lb./100 ft.[2]) | |
| IBMA | 0.13 | 0.2 | 9 | 8 | 2 | 6.4 |
| IBMA | 0.13 | 0.5 | 14.5 | 13 | 3 | 7.7 |
| IBMA | 0.13 | 1.0 | 42.5 | 35 | 15 | 8.6 |
| IBMA | 0.34 | 0.2 | 29 | 15 | 28 | 6.4 |
| IBMA | 0.34 | 0.5 | 22 | 18 | 8 | 7.6 |
| IBMA | 0.34 | 1.0 | 61 | 44 | 34 | 8.3 |
| IBMA | 0.57 | 0.2 | 45.5 | 16 | 59 | 6.2 |
| IBMA | 0.57 | 0.5 | 33 | 23 | 20 | 7.4 |
| IBMA | 0.57 | 1.0 | 90 | 60 | 60 | 8.1 |
| Blank | Blank | 0.0 | 103 | 16 | 174 | 5.0 |
| PMA | 0.06 | 0.2 | 44 | 24 | 40 | -------- |
| PMA | 0.06 | 0.5 | 14 | 13 | 2 | 6.7 |
| PMA | 0.06 | 1.0 | 45 | 38 | 14 | 8.5 |
| PMA | 0.09 | 0.2 | 8 | 7 | 2 | 6.5 |
| PMA | 0.09 | 0.5 | 12 | 11 | 2 | 7.4 |
| PMA | 0.09 | 1.0 | 32.5 | 29 | 7 | 8.2 |
| PMA | 0.16 | 0.2 | 20 | 10 | 20 | 6.7 |
| PMA | 0.16 | 0.5 | 17 | 15 | 4 | 7.6 |
| PMA | 0.16 | 1.0 | 58.5 | 46 | 25 | 8.3 |
| PMA | 0.21 | 0.2 | 48 | 12 | 72 | 6.6 |
| PMA | 0.21 | 0.5 | 22 | 19 | 6 | 7.4 |
| PMA | 0.21 | 1.0 | 65 | 50 | 30 | 8.2 |
| PMA | 0.26 | 0.2 | 40 | 15 | 50 | 6.8 |
| PMA | 0.26 | 0.5 | 22 | 19 | 6 | 7.7 |
| PMA | 0.26 | 1.0 | 75 | 55 | 40 | 8.2 |
| PMA | 0.30 | 0.2 | 61 | 4 | 112 | 6.8 |
| PMA | 0.30 | 0.5 | 32 | 26 | 12 | 7.4 |
| PMA | 0.30 | 1.0 | 90 | 65 | 50 | 8.3 |

[1] Specific viscosity.
[2] Stormer viscosity 600 r.p.m. (cp.).
[3] Above 150 centipoises or not measurable.

*Table VII.—Salt-water mud*

| Copolymer Additive | $\eta_{sp}$[1] | Amt of Additive (lb./bbl.) | Viscosity | | | pH |
|---|---|---|---|---|---|---|
| | | | Fann (cp.) | Plastic (cp.) | Yield Pt. (lb./100 ft.[2]) | |
| Blank | Blank | 0 | [2] Plastic | ---- | ---- | 11.4 |
| EMA | 0.054 | 0.2 | [3] 78 | ---- | ---- | 11.7 |
| EMA | 0.054 | 0.4 | [3] 42.5 | ---- | ---- | 11.6 |
| EMA | 0.054 | 1.0 | [3] 15 | ---- | ---- | 11.8 |
| EMA | 0.054 | 2.0 | [3] 9 | ---- | ---- | 11.9 |
| EMA | 0.064 | 0.2 | [3] 52.5 | ---- | ---- | 11.5 |
| EMA | 0.064 | 0.4 | [3] 24.0 | ---- | ---- | 11.5 |
| EMA | 0.064 | 1.0 | [3] 10.5 | ---- | ---- | 11.5 |
| EMA | 0.110 | 0.2 | [3] 81 | ---- | ---- | 11.2 |
| EMA | 0.110 | 0.4 | [3] 80 | ---- | ---- | 11.4 |
| EMA | 0.110 | 1.0 | [3] 19.5 | ---- | ---- | 11.6 |
| EMA | 0.110 | 2.0 | [3] 10.0 | ---- | ---- | 12.8 |
| Blank | Blank | 0 | 57 | 12 | 90 | 12.8 |
| IBMA | 0.13 | 0.5 | 20.5 | 9 | 23 | 12.5 |
| IBMA | 0.13 | 1.0 | 10 | 8 | 4 | 12.5 |
| IBMA | 0.13 | 1.5 | 9 | 8 | 2 | 12.3 |
| IBMA | 0.13 | 2.0 | 8.5 | 8 | 1 | 12.6 |
| IBMA | 0.34 | 0.5 | 13 | 9 | 8 | 12.7 |
| IBMA | 0.34 | 1.0 | 7.5 | 7 | 1 | 12.6 |
| IBMA | 0.34 | 1.5 | 7.5 | 7 | 1 | 12.3 |
| IBMA | 0.34 | 2.0 | 8 | 8 | 0 | 12.4 |
| IBMA | 0.57 | 0.5 | 17 | 11 | 12 | 12.4 |
| IBMA | 0.57 | 1.0 | 8.5 | 9 | −1 | 12.3 |
| IBMA | 0.57 | 1.5 | 8.5 | 9 | −1 | 12.6 |
| IBMA | 0.57 | 2.0 | 9 | 9 | 0 | 12.6 |
| Blank | Blank | 0 | 75.5 | 19 | 113 | 12.5 |
| PMA | 0.06 | 0.5 | 16.5 | 11 | 11 | 12.5 |
| PMA | 0.06 | 1.0 | 10.5 | 8 | 5 | 12.3 |
| PMA | 0.06 | 1.5 | 8.5 | 8 | 1 | 12.2 |
| PMA | 0.06 | 2.0 | 9 | 8 | 0 | 12.6 |
| PMA | 0.09 | 0.5 | 13 | 9 | 8 | 12.4 |
| PMA | 0.09 | 1.0 | 9.5 | 9 | 1 | 12.3 |
| PMA | 0.09 | 1.5 | 9 | 8 | 2 | 11.9 |
| PMA | 0.09 | 2.0 | 9 | 9 | 0 | 12.6 |
| PMA | 0.16 | 0.5 | 17.5 | 10 | 15 | 12.6 |
| PMA | 0.16 | 1.0 | 9 | 8 | 2 | 12.4 |
| PMA | 0.16 | 1.5 | 8.5 | 8 | 1 | 12.2 |
| PMA | 0.16 | 2.0 | 8 | 8 | 0 | 12.5 |
| PMA | 0.21 | 0.5 | 14 | 10 | 8 | 12.3 |
| PMA | 0.21 | 1.0 | 8.5 | 8 | 1 | 12.2 |
| PMA | 0.21 | 1.5 | 7 | 7 | 0 | 12.0 |
| PMA | 0.21 | 2.0 | 7.5 | 8 | −1 | 13.0 |
| PMA | 0.26 | 0.5 | 12 | 9 | 5 | 12.9 |
| PMA | 0.26 | 1.0 | 10 | 10 | 0 | 12.8 |
| PMA | 0.26 | 1.5 | 9.5 | 9 | 1 | 12.7 |
| PMA | 0.26 | 2.0 | 10 | 10 | 0 | 13.0 |
| PMA | 0.30 | 0.5 | 12 | 8 | 8 | 12.9 |
| PMA | 0.30 | 1.0 | 11 | 10 | 2 | 12.9 |
| PMA | 0.30 | 1.5 | 9.5 | 9.5 | 0 | 12.7 |
| PMA | 0.30 | 2.0 | 10 | 10 | 0 | |

[1] Specific viscosity.
[2] Above 150 centipoises or not measurable.
[3] Stormer viscosity 600 r.p.m. (cp.).

Consideration of the foregoing data will make it apparent that there are provided by this invention some particularly valuable additives for the control of viscosity in drilling muds. The copolymers of the invention act as thinners in drilling fluids containing clays of divergent characteristics. Their beneficial effect on the mud viscosity is obtained at little or no sacrifice in other important properties such as gel strength or filtration rate. In addition, these copolymer additives are not subject to decomposition and the muds in which they are incorporated have excellent heat stability, i.e., the efficacious effect of the mud additives is not significantly different even when the mud is subjected to elevated temperatures.

This application is a continuation-in-part of our copending application Serial No. 507,989, filed May 12, 1955, now abandoned.

What is claimed is:

1. A drilling fluid comprising an aqueous suspension of finely divided solid inorganic materials and a sufficient amount of a copolymer of ethylene and maleic anhydride having a specific viscosity below a value of about 0.70 to maintain the viscosity of the mud low enough so that it can be circulated.

2. A drilling fluid comprising an aqueous suspension of finely divided solid inorganic materials and a sufficient amount of a copolymer of ethylene and maleic anhydride having a specific viscosity in the range from about 0.05 to about 0.3 to maintain the viscosity of the mud low enough so that it can be circulated.

3. The drilling fluid of claim 2 wherein the ethylene-maleic anhydride copolymer is present in the form of its alkali metal salt.

4. The drilling fluid of claim 2 wherein the ethylene-maleic anhydride copolymer is present in the form of its disodium salt.

5. The drilling fluid of claim 2 wherein the ethylene-maleic anhydride copolymer is present in the form of its half-amide, half-ammonium salt.

References Cited in the file of this patent

UNITED STATES PATENTS

| | | |
|---|---|---|
| 2,378,629 | Hanford | June 19, 1945 |
| 2,718,497 | Oldham et al. | Sept. 20, 1955 |
| 2,857,365 | Johnson | Oct. 21, 1958 |